(12) United States Patent  
Jacobs et al.

(10) Patent No.: US 8,341,667 B2
(45) Date of Patent: Dec. 25, 2012

(54) ADVERTISING DRIVEN SWITCHED DIGITAL VIDEO

(76) Inventors: Philip Clifford Jacobs, Windham, NH (US); Srinivas Gummadi, Suwanee, GA (US); Benjamin Phillip Hollin, Mountain View, CA (US); Jason Cade Osborne, Suwanee, GA (US); Gary M. Springer, Alpharetta, GA (US)

( * ) Notice: Subject to any disclaimer, the term of this patent is extended or adjusted under 35 U.S.C. 154(b) by 288 days.

(21) Appl. No.: 12/821,334

(22) Filed: Jun. 23, 2010

(65) Prior Publication Data

US 2011/0321088 A1     Dec. 29, 2011

(51) Int. Cl.
*H04N 5/445* (2006.01)

(52) U.S. Cl. ............ 725/34; 725/35; 725/116; 709/219

(58) Field of Classification Search .............. 725/34–36, 725/91–93, 106–116; 709/217–232
See application file for complete search history.

(56) References Cited

U.S. PATENT DOCUMENTS

| | | | |
|---|---|---|---|
| 5,661,516 A | 8/1997 | Carles | |
| 6,698,020 B1 * | 2/2004 | Zigmond et al. | 725/34 |
| 6,986,156 B1 * | 1/2006 | Rodriguez et al. | 725/95 |
| 8,032,914 B2 * | 10/2011 | Rodriguez | 725/97 |

* cited by examiner

*Primary Examiner* — Annan Shang
(74) *Attorney, Agent, or Firm* — Merchant & Gould P.C.

(57) ABSTRACT

Advertising driven switched digital video may be provided. A plurality of content streams may be transmitted. In response to determining that an available transmission bandwidth has increased, at least one new content stream may be provided according to a bandwidth-based priority list. In response to determining that the available transmission bandwidth has decreased, at least one content stream may be removed according to the bandwidth-based priority list.

20 Claims, 5 Drawing Sheets

ADVERTISING DRIVEN SWITCHED DIGITAL VIDEO

BACKGROUND

Advertising driven switched digital video (SDV) provides a method and system for prioritizing multiple channel versions for target audiences. Audience members of cable television services may be grouped by characteristics into different audience cohorts, but conventional systems do not allow cable service providers to assign those audience members to channel versions based on their cohort. Furthermore, conventional systems do not provide any way for service providers to forecast available audience cohorts and thus predetermine how many versions of different channels should be made available within existing bandwidth constraints.

SDV is a network scheme for distributing digital video via a cable. Switched video may transmit digital video in a more efficient manner so that additional uses may be made of the freed up bandwidth. The scheme may apply to digital video distribution both on hybrid fiber-coax cable TV systems using QAM channels and/or on IPTV systems. In current hybrid fiber-coaxial systems, a fiber optic network extending from the operator's central office may carry all video channels out to a fiber optic node which may serve any number of subscriber premises, such as 1,000 homes. In conventional systems, all channels are sent via coaxial cable from the fiber node to each of the homes regardless of how may homes are actively watching channels at a given time. With SDV, unwatched channels may not need to be sent.

BRIEF DESCRIPTION OF THE DRAWINGS

The accompanying drawings, which are incorporated in and constitute a part of this disclosure, illustrate various embodiments of the present invention. In the drawings.

DESCRIPTION OF EXAMPLE EMBODIMENTS

Overview

Figure 1:
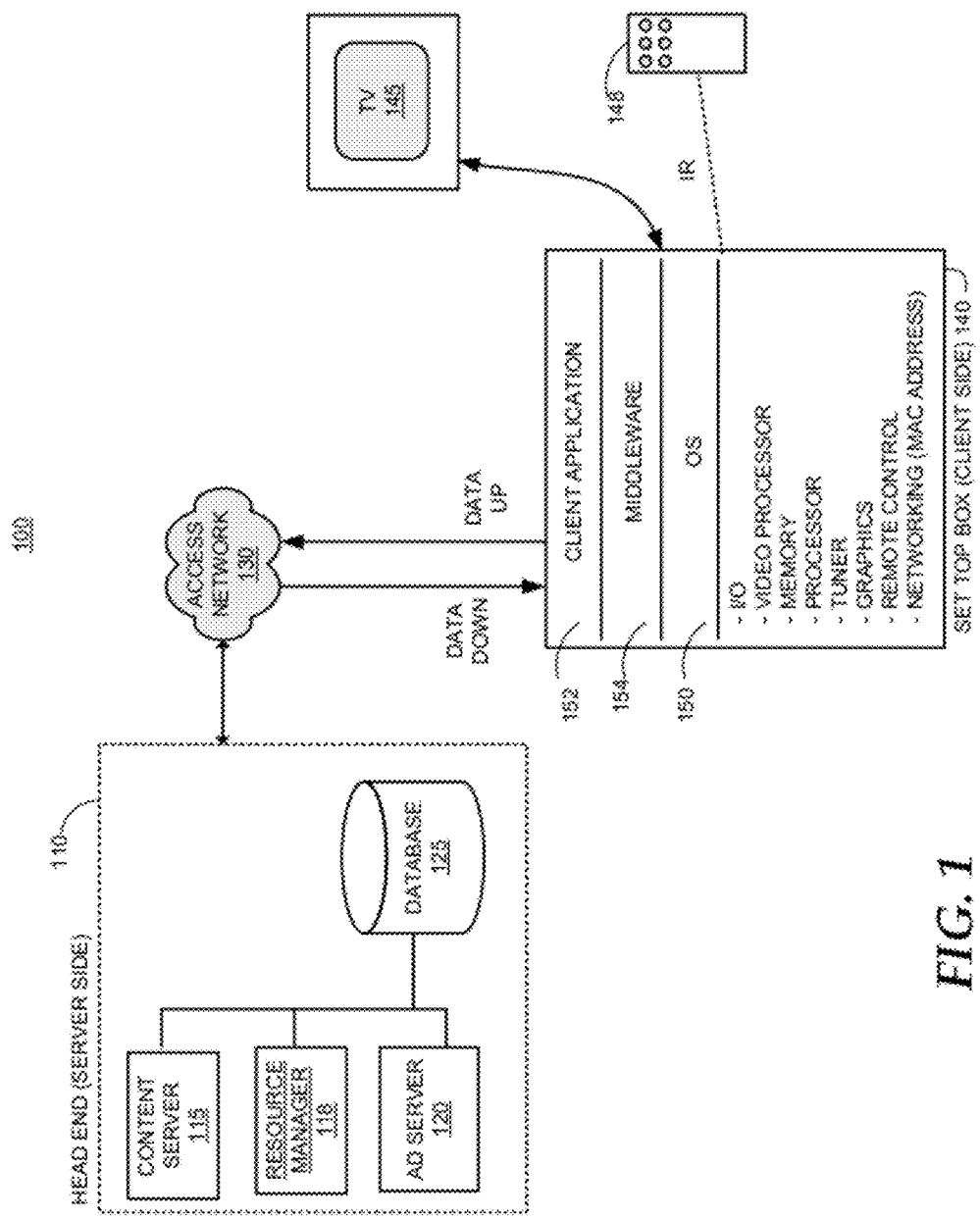
FIG. 1 is a block diagram of a cable television network.

Consistent with embodiments of the present invention, systems and methods are disclosed for providing advertising driven switched digital video (SDV). Advertising driven switched digital video may be provided. A plurality of content streams may be transmitted. In response to determining that an available transmission bandwidth has increased, at least one new content stream may be provided according to a bandwidth-based priority list. In response to determining that the available transmission bandwidth has decreased, at least one content stream may be removed according to the bandwidth-based priority list.

It is to be understood that both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Advertising driven switched digital video (SDV) may be provided. Consistent with embodiments of the invention, audience forecasting based on data associated with audience members may be used to negotiate advertising campaign contracts. For example, available audience members may be divided into cohorts such as demographics (e.g., age range, gender, household income, etc.), psychographics (e.g., attitudes, lifestyles, content type preferences, etc), customer type (e.g., multi-service subscribers, loyal/occasional, in-market, etc.), and/or other custom factors. Different cohorts may be aggregated together into "super-cohorts." Campaign contracts may then provide for an advertiser to request that an advertising campaign be presented to a minimum number of viewers in given cohorts. Further, different ad versions associated with a campaign may be directed at different viewers or cohorts.

As the ads associated with the campaign are displayed to audience members, the cohort(s) to which those audience members belong may be tracked for reporting and accounting. Further, the tracking numbers may be used to increase and/or decrease the number of viewing impressions a particular ad campaign and/or version may receive in order to meet the requirements of the campaign contract. For example, a contract may require that a particular ad version be seen by 3 million audience members within the 25-34 age range over the course of a five day period. If only 1 million viewers have seen the ad by day 3 of the period, the priority of showing that ad version to that age range may be increased in order to increase the likelihood of meeting the goal.

Consistent with embodiments of the invention, SDV may be used to provide different versions of a particular channel, wherein each channel version may comprise the same content programming but carry advertising for different campaigns and/or different ad versions within the same campaign. For example, two versions of CNBC may be transmitted, one carrying ad versions directed toward audience members in the 25-34 age range and one carrying ad versions directed toward audience members in the 35-50 age range. As the available bandwidth for channel transmission increases, such as when fewer different channels and/or on demand programs are being transmitted, new channel versions may be added. For example, campaign contracts may indicate advertiser interest in a third version of CNBC with ad versions directed towards female viewers. If the financial value of adding a third channel version and the projected available bandwidth permits, then a third channel version with female focused ads can additionally be transmitted. This new channel version may be added, for example, according to a pre-established priority list based on audience forecasting and/or may be reactively added based on an evaluation of the current audience member characteristics. Female viewers receiving either of the two existing channels versions may be migrated to the new third channel, and the ads on the pre-existing two channels may be better targeted towards males. In that way, the three audience segments will receive better targeted ads according to the campaign contract Advertising driven SDV may comprise a method for maximizing the matches between the audience and the ad campaigns' audience target requirements. Different cohorts may be grouped together to optimize the efficiency of meeting ad contract requirements from different advertisers. For example, an age cohort (e.g., 25-34) comprising 500,000 audience members may be grouped with a "frequent traveler" lifestyle cohort comprising 1,000,000 audience members and a multi-service subscriber cohort (e.g., a subscriber purchasing broadband network and phone services from the same cable television provider) comprising 2,000,000 audience members. This may result in a super-cohort of 3,500,000 audience members for a given content stream that may meet varying criteria for ad contracts as the respective advertising campaigns and/or ad versions are displayed.

These super-cohort groupings may be calculated based on predictions of who will request each channel stream. For a simplified example, regular audience members of a drama channel may be divided into two large cohorts, A and B. Regular audience members of a news channel may be similarly divided into two cohorts, C and D. The cable provider may use these predicted audience numbers and their ad contract requirements to decide whether to allocate bandwidth to two versions of the drama channel and one of the news channel or one drama channel version and two news channel versions. If the available ad contracts have no overlapping requirements between cohorts A and B, but at least one advertiser has a campaign targeting both cohorts C and D, it may be determined to be more efficient to use two versions of the drama channel—one for cohort A and one for cohort B—and stream a single version of the news channel to audience members in cohorts C and D.

Further, by analyzing and predicting which cohorts are viewing a particular ad, resources such as bandwidth may be optimized for delivering requested channels while ensuring that ad contract requirements are efficiently met. For example, an ad campaign may have five versions to be run on a given channel, but forecasting may determine that rather than running five versions of one channel, it may be more efficient to only run three of them on a given day so that other ad campaigns may make use of the advertising slots on alternate versions of other channels. Based on forecasted audience cohorts and numbers, a priority list comprising a number of different channel versions with associated advertising versions may be produced. The priority list may be used to decide what new channel versions to add if more channel transmission bandwidth becomes available and/or which channel versions to remove if less channel transmission bandwidth becomes available.

During the optimization computation of audience to potential sets of ads within a time slot, some portion of the audience may not be desired by certain campaigns. This portion may comprise a remnant audience and may be valuable to other campaigns. By specifying a constrained spot distance, which may comprise a time distance away from an initially agreed upon spot time that the spot may be placed, the optimization computation may consider more possible combinations which may result in minimizing the remnant audience. For example, the spot distance may be defined as anywhere within an ad pod (e.g., a set of ads displayed in between program content segments), anywhere within the program, and/or within the same-day part. For example, each of 3 channel versions may all be scheduled to show the same campaign during the same time slot. When spot distance is defined as anywhere with the ad pod, the optimization computation may find that the remnant audience is better minimized, and value delivered is maximized, by running different campaigns across channel versions within the same time slot rather than ads from the same campaign.

FIG. 1 is a block diagram view of a cable television system (CTS) 100 comprising an integrated network system that features video, audio, voice and data services to audience members or set top box (STB) users. CTS 100 may comprise a head end 110 comprising a content server 115, a resource manager 118, an ad server 120, and a database 125. Head end 110 may be communicatively coupled to an access network 130, such as a hybrid fiber coax (HFC) cable television network operative to transmit data to and/or from a client set top box (STB) 140. Database 125 may be operative to store channel priority lists and/or MAClists comprising MAC addresses (and/or other unique identifiers, such as IP addresses and/r content provider assigned identifiers) associated with client STBs in each audience cohort. Resource manager 118 may be operative to monitor and allocates bandwidth to different channel versions.

Figure 5:
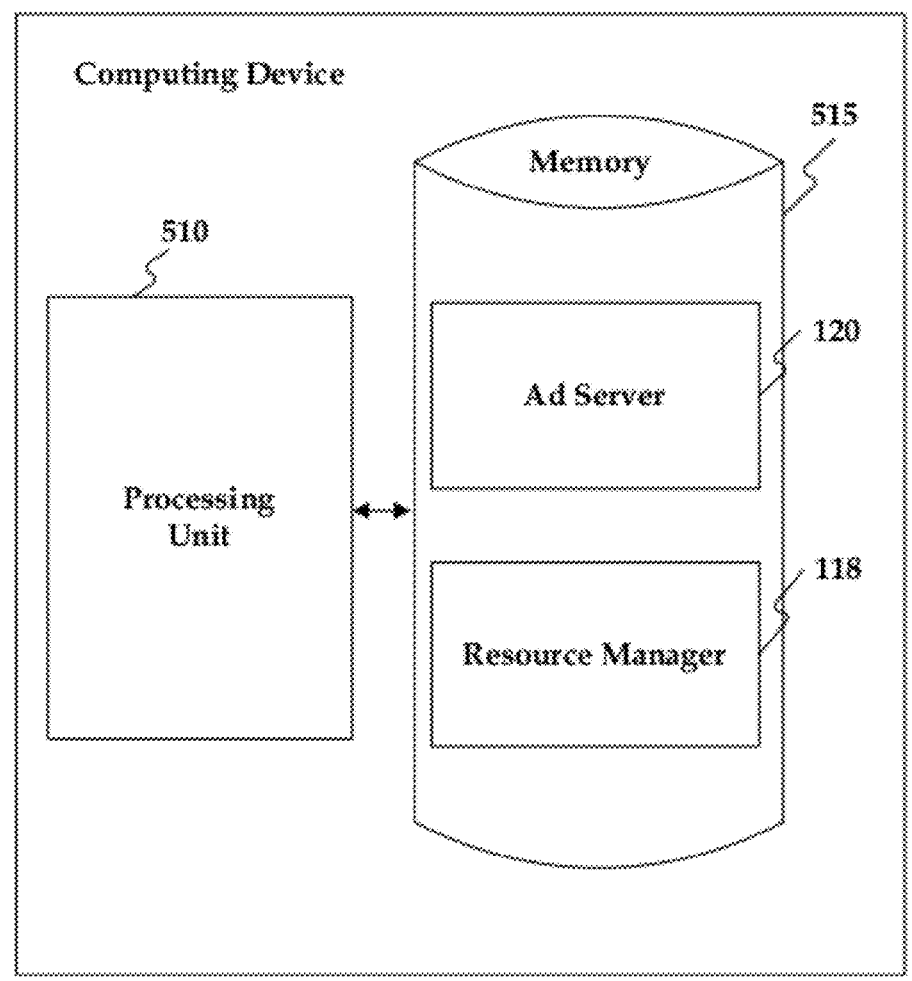
FIG. 5 is a block diagram of a computing device.

Digital and analog video programming and digital and analog data may be provided to a display device such as a television set 145 via set-top box (STB) 140. Interactive television services that allow a customer to input data to CTS 100 may likewise be provided by STB 140. As illustrated in FIG. 5, STB 140 may comprise a multipurpose computing device having a computer processor, memory and an input/output mechanism. The input/output mechanism may receive input from server-side processes via access network 130 and from customers via input devices such as a remote control device 148. Remote control device 148 may communicate with STB 140 via a suitable communication transport such as an infrared connection. STB 140 may also include a video processor for processing and providing digital and analog video signaling to television set 145 via a cable communication transport. A multi-channel tuner may be provided for processing video and data to and from STB 140 and head end 110STB 140 may also comprise an operating system 150 for directing the functions of STB 140 in conjunction with a variety of client applications.

Because a variety of different operating systems 150 may be utilized by a variety of different brands and types of set-top boxes, a middleware layer 154 may be provided to allow a given software application to be executed by a variety of different operating systems. According to an embodiment of the present invention, middleware layer 154 may include a set of application programming interfaces (API) that are exposed to client application 152 and operating system 150 that allow client application 152 to communicate with operating system 150 through common data calls understood via the API set. A corresponding middleware layer may be included on the server side of CATV system 100 for facilitating communication between server-side content server 115 and client-side STB 140. In CTS 100, STB 140 may send a channel request signal back to head end 110. If a channel is not currently being transmitted on the coaxial line, a distribution hub may allocate a new QAM channel and transmit the new channel to the coaxial cable via a fiber optic node in access network 130.

CTS 100 may deliver broadcast video signals as digitally formatted signals in addition to delivering traditional broadcast analog video signals. Furthermore, CTS 100 may support one-way broadcast services as well as both one-way data services and two-way media and data services. The two-way operation of the network may allow for user interactivity with services, such as Pay-Per-View programming, Near Video- On-Demand (NVOD) programming, Video-on-Demand (VOD) programming, and interactive applications, such as Internet connections and interactive services that render real-time bi-directional communication on a personalized basis such as bi-directional audio-visual communication. CTS 100 may also provide interfaces, network control, transport control, session control, and servers to access content and services, and may distribute content and services to STT users. CTS 100 may also provide the interfaces, network control, transport control, session control, and servers to establish on-demand session-based bi-directional communication service between a particular remote destination and a STT user for delivering media from the particular remote destination to the STT user and input information from the STT user to the particular remote destination. A remote destination during a session of a bi-directional communication service may comprise a remote personal destination such as a friend or a remote vendor that offers a bi-directional communication service for a purchasable period of time in which a viewer communicates real-time with the vendor on a personal basis. In either case, dedicated CTS 100 resources may be allocated to fulfill individualized bi-directional communication over a purchasable period.

Figure 2:
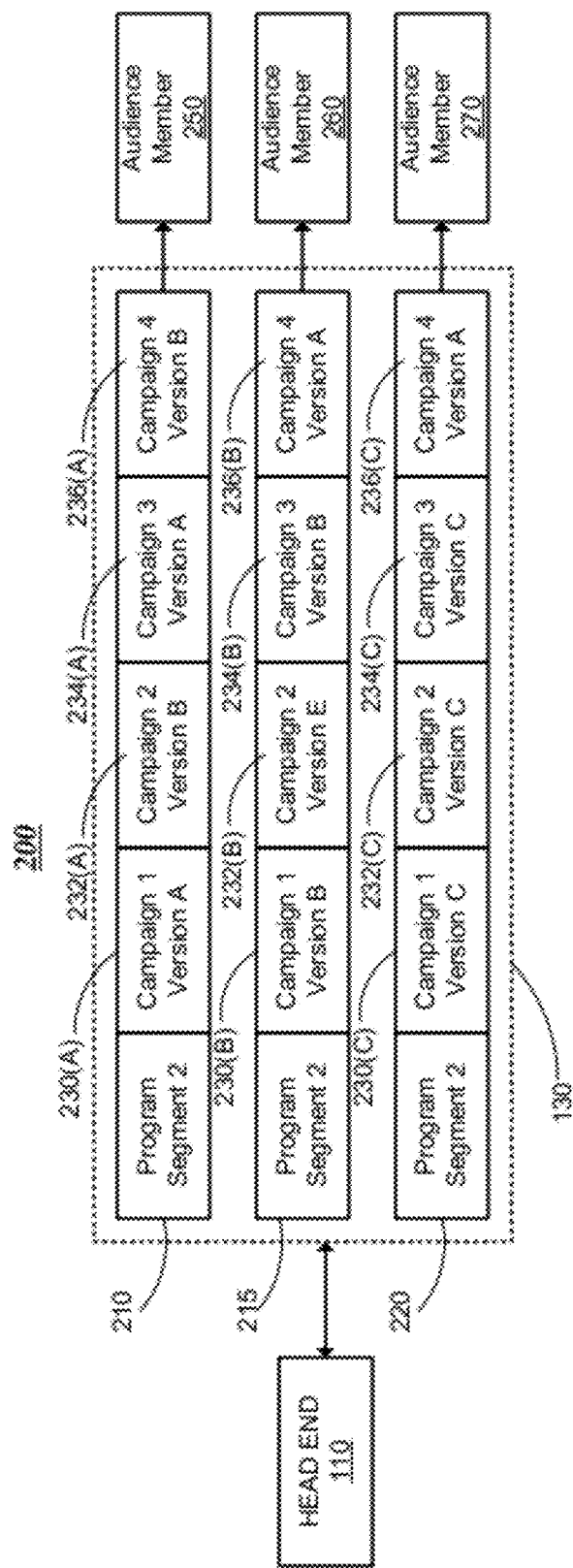
FIG. 2 is an illustration of an example channel stream.

FIG. 2 is an illustration of an example channel stream 200. Head end 110 may transmit a first channel version 210, a second channel version 215, and a third channel version 220 to a first audience member 250, a second audience member 260, and a third audience member 270, respectively, over access network 130. Each of the audience members may receive the same program segment associated with the content stream of its respective channel (e.g., the second segment of "Nightly News" on each of three versions of NBC).

As an example scenario, first audience member 250 may belong to the "In ZIP 303XX" and "Age: 18-24" audience cohorts, second audience member 260 may belong to the "Not In ZIP 303XX" and "Age: 25-34" audience cohorts, while third audience member 270 may belong to the "In ZIP 303XX" and "Income>100K" audience cohorts. Four advertising campaigns (Campaign 1-Campaign 4) may have different ad versions to be presented to different cohorts, such as Age Range 18-24 and Age Range 25-34, as illustrated in Table 1, below. Other cohorts may be used, such as targeting different ad versions at audience members by factors not associated with income, age, or location.

TABLE 1

|  | Campaign 1 | Campaign 2 | Campaign 3 | Campaign 4 |
|---|---|---|---|---|
| Age: 18-24 | Version A | Version B |  | Version B |
| Age: 25-34 | Version B | Version A |  | Version A |
| Income > 100K | Version C | Version C |  |  |
| In ZIP 303XX |  | Version D | Version A |  |
| Not In ZIP 303XX |  | Version E | Version B |  |

In this example scenario, each audience member 250, 260, 270 may receive a first advertising slot 230(A)-(C) associated with Campaign 1, a second advertising slot 232(A)-(C) associated with Campaign 2, a third advertising slot 234(A)-(C) associated with Campaign 3, and a fourth advertising slot 236(A)-(C) associated with Campaign 4. Consistent with embodiments of the invention, different channel versions may receive ads associated with different campaigns in each advertising slot in addition to receiving different versions of ads associated with the same campaign.

Audience member 250 may be matched to a channel version with ads comprising Version A of Campaign 1, Version B of Campaign 2, and Version B of Campaign 4 based on membership in the "Age: 18-24" audience cohort and Version A of Campaign 3 based on membership in the "In ZIP 303XX" cohort. Although Campaign 2 also comprises an ad version (Version D) for audience members in the "In ZIP 303XX" cohort, in this example scenario no channel version is carrying that ad cohort. If enough audience members in the same shared cohorts request the channel, it may be determined that adding a new version of the channel would be more efficient at reaching the Campaign 2 contract's requirements. In this example, however, Version B of Campaign 2 still meets at least some of that contract's requirements.

Similarly, second audience member 260 may be matched to a channel version with ads comprising Version B of Campaign 1, Version E of Campaign 2, and Version A of Campaign 4 based on membership in the "Age: 25-34" audience cohort and Version B of Campaign 3 based on membership in the "Not In ZIP 303XX" cohort. As before, two different versions of Campaign 2 match with second audience member 260's audience cohorts, and a determination may be made at the time second audience member 260 requests to begin receiving the channel whether advertising delivery would be more efficient in terms of campaign contract requirements by adding a new channel version. Such determinations may be periodically revisited as audience members comprising different cohorts join and leave a particular channel version.

Third audience member 270 may be matched to a channel version with ads comprising Version C of Campaign 1, Version C of Campaign 2, and Version C of Campaign 3 based on respective audience cohort memberships, but no ad in Campaign 4 matches with any of third audience member 270's cohorts. A version of Campaign 4's ads may be picked (in this example, Version A) based on what cohorts other audience members viewing that channel version belong to and third audience member may be counted as a general impression and/or not counted as an impression at all depending on the terms of the campaign contract.

The selection of which ads to display in a given channel and/or during a particular spot in an ad pod may be optimized according to the projected audience members. This optimization may rely on tracked set top box usage information (e.g., known demographic or other factors associated with audience members, amounts and times that programs are viewed, etc.) For example, a given set top box (STB) may be known to view an average of three hours of Fox network programming on Tuesday nights; this may be incorporated into a forecast for an upcoming Tuesday as a potential audience member for that channel. This forecasting may be done across numerous STBs across a given area and each STB may be classified into one and/or more cohorts as defined by all campaigns that may be run during the forecasting period. For example, one campaign may target ad versions at audience member cohorts according to the number of children in the household while another campaign may target household income cohorts. Each STB may then be classified into a number of children cohort and a household income cohort. STBs may then be further grouped into super-cohorts comprising multiple STBs that share cohort groupings. For example, one super-cohort may comprise STBs that belong to a "no children" cohort and to a "household income over 100K" cohort, while another super-cohort may comprise STBs belonging to a "2-3 children" cohort and the "household income over 100K" cohort.

An optimization computation may then be run to generate MAClists from the super-cohorts and the associated ad schedules having the best fit (i.e., the least error and remnants) between audience and ad set target cohorts. The optimization computation may also consider the greatest value across campaigns for the forecast period by evaluating combinations of super-cohorts segmented into a set of MAClists, and which campaign ad versions could be played to those MAClists. A priority list for the forecast period may be generated based upon the value associated with each channel version. During the forecast period, channel versions may be added or removed per the priority list as available bandwidth changes, and STBs may be migrated among channel versions based upon the MAClists. The priority list may comprise channels that require differing amounts of bandwidth, such as standard definition and high definition channels. The optimization process may consider the required bandwidth of the channels when establishing which should be allowed more versions when bandwidth becomes available. For example, the optimization may consider whether adding two standard definition versions of channels would allow greater targeting of needed cohorts and thus result in better meeting ad contract requirements than one additional high definition channel.

Figure 3:
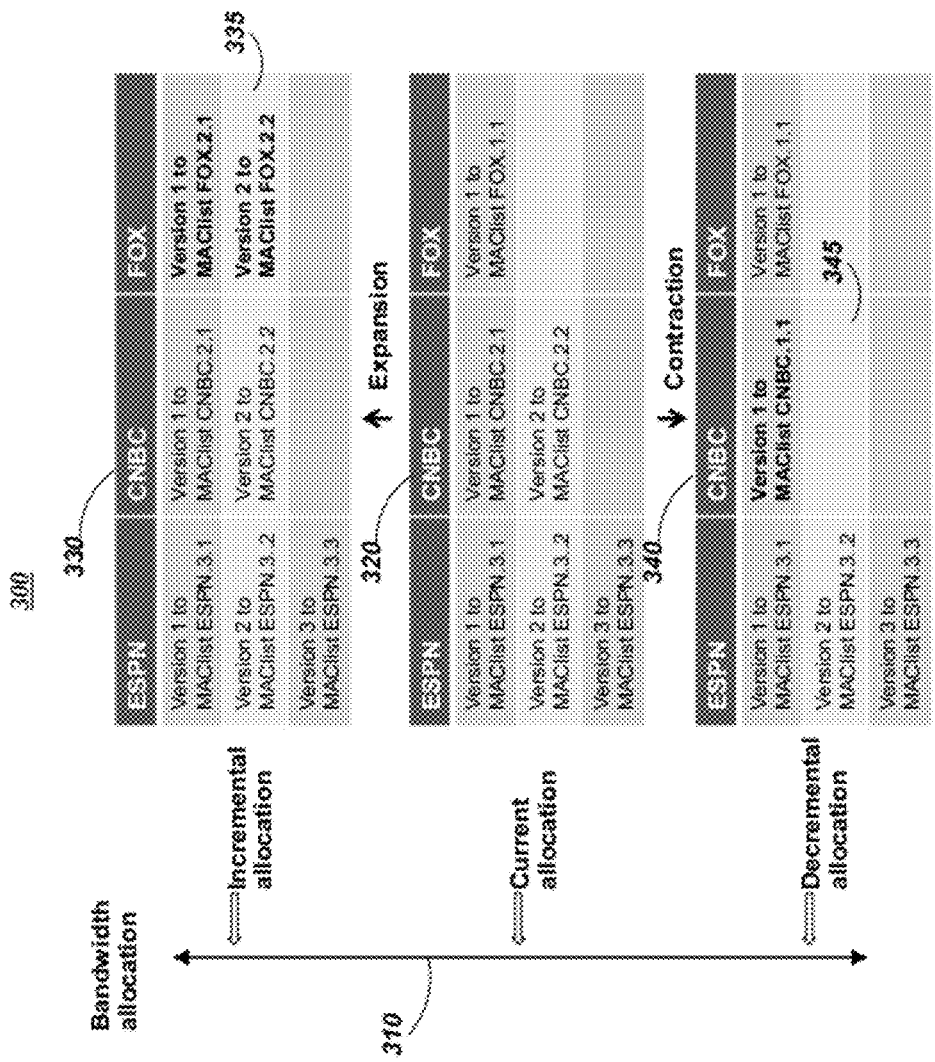
FIG. 3 is an illustration of bandwidth allocation effects.

FIG. 3 is an illustration 300 of bandwidth allocation effects according to a priority list. For example, as an available channel bandwidth 310 increases, a first available channel version lineup 320 may change to a second available channel lineup 330, expanding to add a second version of Fox 335. The newly added second version may be sent to audience members associated with a MAClist (i.e., a set of MAC addresses, each MAC address associated with an STB of an audience member), such as MAClist Fox 2.2 stored in database 125 comprising those audience members identified in an audience cohort (and/or super-cohort) needed to meet the requirements of the various campaign contracts. Throughout the specification, MAClists and/or channel versions may be identified by a format such as MAClist x.y, where the MAClist is associated with a channel, x represents a number of versions of that channel, and y represents a particular version of that channel. For example, Fox 2.1 may comprise the first of two versions of the Fox channel and may be associated with a particular MAClist.

Audience members receiving the prior version of Fox, 1.1, may be transitioned to either channel version 2.1 or channel version 2.2 depending upon whether their MAC address is associated with MAClist 2.1 or MAClist 2.2 for those channel versions. As described above, the MAC address for each audience member may be assigned to one MAClist or the other depending on whether their audience cohort(s) comprise a better match, in terms of efficiently meeting ad contract requirements, with the advertising allocated to the new channel version. Conversely, as available channel bandwidth 310 decreases, first channel lineup 320 may change to a third channel lineup 340 comprising the replacement of two CNBC channel versions, 2.1 and 2.2, by a single channel version 1.1. Viewers who had been watching CNBC channel versions 2.1 and 2.2 may be migrated to watch CNBC channel version 1.1, which may have a different set of ads than either of the previous two channel versions.

On a periodic basis (e.g., nightly), based on the desired cohorts, a plurality of MAClists may be created for the expected number of versions, for every channel, to cover every MAC address by zone. The MAClists may be stored, for example, in database 125. For example, for a single channel there may be a single channel version MAClist, a pair of MAClists to be assigned when two versions of a channel are being transmitted, three MAClists, each associated with a channel version, when three versions of the channel are being transmitted, etc. Each STB MAC address may appear once in the MAClists associated with the one channel version, the two channel versions, the three channel versions, and so forth. That is, each STB in a given subscription area may be pre-allocated to a channel version, for each channel and for each instance when different channel versions are available according to its cohort memberships in case that STB beings requesting and viewing that channel.

These assignments may further vary over the course of the forecasted period. For example, the ESPN channel may have three sets of MAClists—1.1 for when a single version is transmitted, 2.1 and 2.2 for when two versions are transmitted, and 3.1, 3.2, and 3.3 for when three versions of ESPN are transmitted. A MAC address for STB 140 may be pre-assigned to list 1.1, 2.2, and 3.2 for one and/or more segments of the forecasted time period, such as from 8 AM to 12 PM. The same MAC address may be pre-assigned to list 1.1, 2.1, and 3.3 for another segment of the same period, such as 12 PM to 4 PM.

Figure 4:
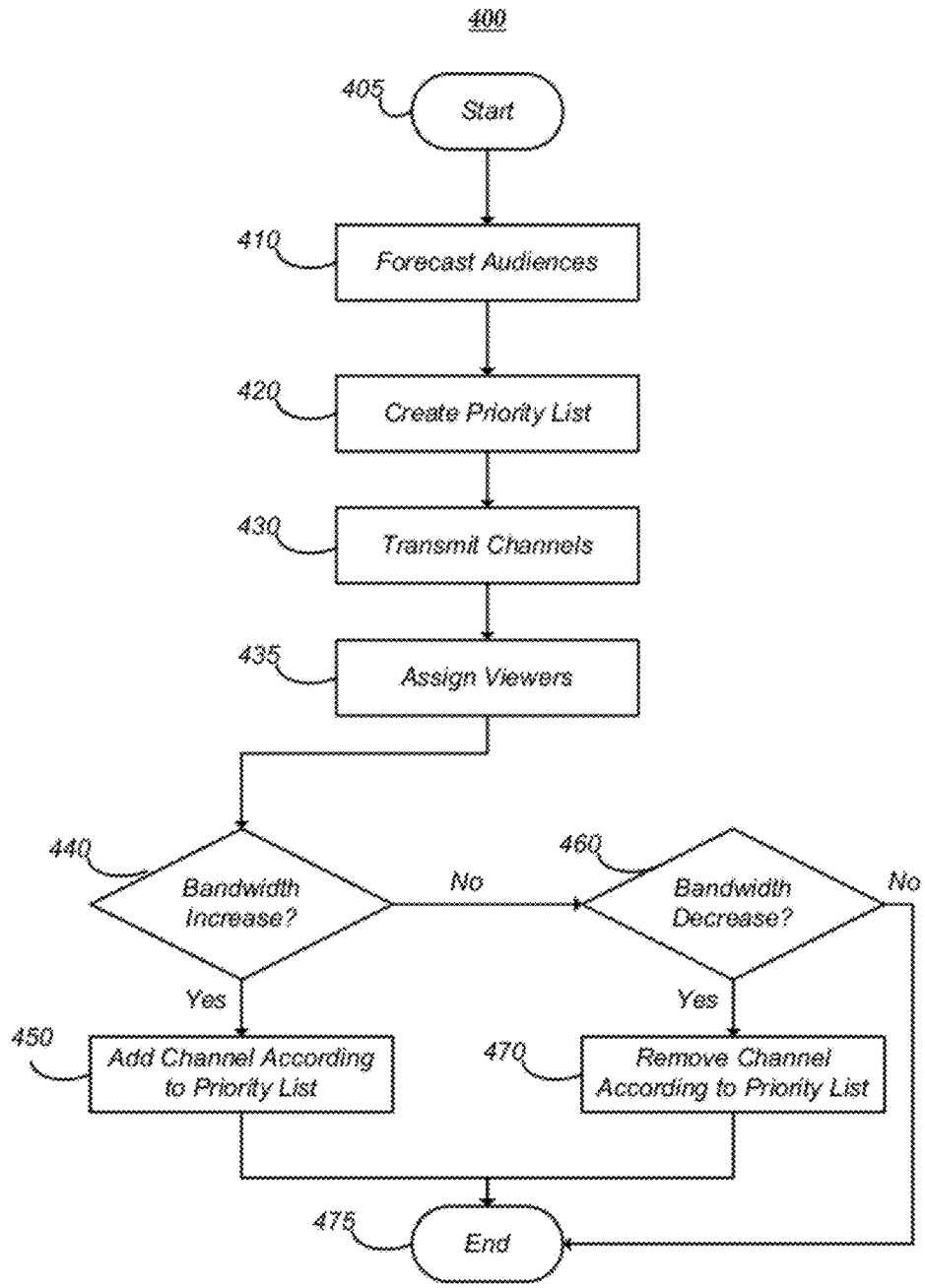
FIG. 4 is a flow chart of a method for providing advertising driven SDV.

FIG. 4 is a flow chart setting forth the general stages involved in a method 400 consistent with embodiments of the invention for providing dynamic content stream management. Method 400 may be implemented using a computing device 500 as described in more detail below with respect to FIG. 5. Ways to implement the stages of method 300 will be described in greater detail below. Method 400 may begin at starting block 405 and proceed to stage 410 where computing device 500 may forecast audiences for future consumption of a plurality of content streams. A cable provider may use previously recorded channel selections and audience sizes to predict what channels may be requested by how many audience members. The forecast may comprise divisions of the audience members into audience cohorts. For example, forecasts for expected audiences for channels broadcast on Friday may be based on audiences over the past day, week, month, year, and/or previous Fridays. Such a forecast may comprise predictions for a plurality of time periods (e.g., a half hour and/or an hour) over the day as to how many audience members from each audience cohort may be viewing a particular channel. An example prediction may comprise 2.3 million audience members overall watching the channel ESPN from 6:00-6:30, divided between three audience cohorts, such as 800,000 males 18-24, 900,000 males from 25-35, and 600,000 women.

From stage 410, method 400 may advance to stage 420 where computing device 500 may create a priority list according to the audience forecasts. The priority list may be based on meeting the needs of demographic targets for advertising campaigns and the data comprising the audience forecasts. For example, the priority list may comprise a list of channels and a number of alternate versions for each channel. The priority list may vary over the course of a day, such as by giving greater priority to different versions of news channels during the morning and greater priority to different versions of entertainment channels during prime time. The priority list may comprise an ordered list of channels and alternate versions to be provided to audience members as transmission bandwidth permits. The channels and versions in the priority list may be associated with target audience cohorts. Table 2, below, illustrates an example priority list. As bandwidth availability changes, the priority list may be consulted to determine what channel lineup change should be made. A "current pointer" may be used to track where in the priority list the cable network may be using for a current channel line up. When forecast bandwidth availability changes, the pointer may move up or down by an amount determined by the bandwidth associated with the channels (e.g. SD or HD). The movement of the pointer across entries indicates which channels should be further examined to determine the new channel lineup.

In Table 2, if the forecast available bandwidth decreases then the pointer moves up; if the available bandwidth increases, the pointer may move down. For example, if the current pointer indicates that the current channel lineup comprises three versions of ESPN (ESPN 3.1, 3.2, and 3.3) and the bandwidth decreases, the pointer may move up and indicate that the new lineup may now include only 2 ESPN versions, from the previous 3 versions (which was higher on the priority list).

TABLE 2

Example Priority List, 6:00 PM-7:00 PM

| Channel Version | Audience Cohort |
| --- | --- |
| ESPN 1.1 | All |
| CNBC 1.1 | All |
| Fox 1.1 | All |
| ESPN 2.1 | Men, 25-35 |
| ESPN 2.2 | Men, 18-24 |
| ESPN 3.1 | Women |
| ESPN 3.2 | Income > 100K + Multi Service |
| ESPN 3.3 | Men 18-24 + Travelers |
| CNBC 2.1 | Income > 100K |
| CNBC 2.2 | All Others |
| Fox 2.1 | Men |
| Fox 2.2 | Women |
| Fox 3.1 | Women, 18-24 |
| Fox 3.2 | Women, 25-35 + Documentary Viewers |
| Fox 3.3 | Men 25-35 + ZIP 303XX |

From stage 420, method 400 may advance to stage 430 where computing device 500 may transmit a plurality of content channels and/or versions. For example, all channels being requested by at least one audience member may be transmitted from headend 110. Each audience member may receive an assignment from headend 110 informing them which channel version to tune.

From stage 430, method 400 may advance to stage 435 where computing device 500 may assign viewers to each channel. For example, all audience members may be assigned to a version of their requested channel according to the MAC address of their STB and its pre-assigned MAClist for that channel's versions.

From stage 435, method 400 may advance to stage 440 where computing device 500 may determine whether available channel bandwidth has increased. For example, a video on demand content stream may end, freeing up that bandwidth.

If available bandwidth increases, method 400 may advance to stage 450 where computing device 500 may add a channel version according to the priority list. For example, headend 110 may begin transmitting a new version of CNBC when increasing bandwidth allows. Method 400 may then end at stage 475. Computing device 500 may then assign audience members to one of the channel versions according to the MAClists associated with each of those versions. For example, when transitioning from two channel versions, 2.1 and 2.2, to three channel versions, 3.1, 3.2, and 3.3, the MAClist associated with each version may determine which channel version is received and displayed by each STB. Cohorts and/or super-cohorts previously assigned to version 2.1, for example, may be redistributed among versions 3.1, 3.2, and 3.3.

If bandwidth has not increased at stage 440, method 400 may advance to stage 460 where computing device 500 may determine whether available channel bandwidth has decreased. For example, a new video on demand content stream may be requested, requiring the use of additional bandwidth.

If available bandwidth decreases, method 400 may advance to stage 470 where computing device 500 may remove a channel version according to the priority list. For example, headend 110 may begin transmitting a single version of CNBC rather than two versions of the channel when bandwidth decreases. Viewers of the multiple versions may be redistributed according to the MAClists associated with the channel versions prior to discontinuing transmission of the removed channel version. For example, if transitioning from three versions, 3.1, 3.2, and 3.3, to two versions, 2.1 and 2.2, the three super-cohorts associated with each of the three prior versions may be split up and recombined into two different super-cohorts, each associated with one of the two versions now being transmitted. Method 400 may then end at stage 475.

Consistent with embodiments of the invention, as available bandwidth increases, channels further down the list may be provided. As available bandwidth decreases, channels further down the list may no longer be provided. Further, one version of the channel may be provided to all audiences when bandwidth is insufficient to provide multiple versions of the channel. When bandwidth increases to allow multiple versions, audience members associated with the single version may be transitioned to audience-cohort appropriate versions of the channel. Also, as channel versions expand, a channel's associated audience cohort(s) may change. For example, as can be seen in the last row of Table 2, as the Fox channel expands from 2 to 3 versions, the second version may be changed from being associated with all women to being associated with Women aged 18-24 and the newly created third version may be associated with women aged 24-35. Female audience members in the 25-35 age range already assigned to the second version may be transitioned to the new version.

An embodiment consistent with the invention may comprise a system for providing advertising driven switched digital video. The system may comprise a memory storage and a processing unit coupled to the memory storage. The processing unit may be operative to forecast a projected audience for each of a plurality of provided channels, create a priority list comprising a priority associated with at least one first version and at least one second version of at least one of the plurality of provided channels, transmit at least a first subset of the plurality of provided channels to a plurality of audience members, and determine whether an available bandwidth for channel transmission has changed. In response to determining that the available bandwidth for channel transmission has changed, the processing unit may be operative to transmit at least a second subset of the plurality of provided channels to the plurality of audience members according to the priority list. The projected audience for each of a plurality of provided channels may be divided into a plurality of audience cohorts each associated with a demographic characteristic. The different versions of the provided channels may be associated with different audience cohorts.

The processing unit may be further operative to receive a channel request from at least one of the plurality of audience members and determine whether the channel request is associated with a channel being transmitted in a plurality of versions. In response to determining that the channel request is associated with a channel being transmitted in a plurality of versions, the processing unit may be further operative to identify a one of the plurality of versions of the channel associated with an audience cohort of the at least one of the plurality of audience members and assign the at least one of the plurality of audience members to the one of the plurality of versions of the channel. In response to determining that the audience cohort associated with the at least one of the plurality of audience members is not associated with at least one version of the requested channel being transmitted, the processing unit may be further operative to determine whether the available bandwidth for channel transmission is sufficient for a new version of the requested channel, and, if so, create a new version of the requested channel and assign the at least one of the plurality of audience members to the new version of the requested channel.

Another embodiment consistent with the invention may comprise a system for providing advertising driven switched digital video. The system may comprise a memory storage and a processing unit coupled to the memory storage. The processing unit may be operative to create a transmission priority list comprising a plurality of content streams, wherein at least one first content stream comprises an alternate version of at least one second content stream and wherein each of the plurality of content streams is associated with at least one of a plurality of audience cohorts, receive a content stream request from at least one of a plurality of audience members, wherein each of the plurality of audience members is associated with at least one of the plurality of audience cohorts, and assign the at least one of a plurality of audience members to at least one of the plurality of content streams according to a best match between the at least one of the plurality of audience cohorts associated with the at least one of a plurality of audience members and the at least one of the plurality of audience cohorts associated with the at least one of the plurality of content streams. The processing unit may be further operative to provide a first subset of the plurality of content streams to the plurality of audience members and provide a second subset of the plurality of content streams to the plurality of audience members according to the transmission priority list in response to detecting a change in available content stream transmission bandwidth.

The second subset of the plurality of content streams may comprise at least one new version of the assigned content stream associated with the at least one of a plurality of audience members. The processing unit may be further operative to determine whether the at least one of the plurality of audience cohorts associated with the at least one of a plurality of audience members comprises a better match with the at least one of the plurality of audience cohorts associated with the at least one new version of the requested content stream than with the at least one of the plurality of audience cohorts associated with the assigned content stream, and, if so, transition the at least one of a plurality of audience members to the at least one new version of the requested content stream.

To transition the at least one of the plurality of audience members to the at least one new version of the requested content stream, the processing unit may be operative to identify a plurality of black frames coinciding between the assigned content stream and the at least one new version of the requested content stream and assign the at least one of the plurality of audience members to the at least one new version of the requested content stream during the plurality of coinciding black frames.

The processing unit may be further operative to provide a new version of at least one content stream as part of the second subset of the plurality of content streams, identify a subset of the plurality of audience members associated with the at least one content stream provided as part of the first subset of the plurality of content streams and associated with at least one audience cohort associated with the new version of at least one content stream, and assign the subset of the plurality of audience members to the new version of at least one content stream.

Yet another embodiment consistent with the invention may comprise a system for providing advertising driven switched digital video. The system may comprise a memory storage and a processing unit coupled to the memory storage. The processing unit may be operative to provide a plurality of content streams according to a bandwidth-based priority list, in response to determining that the available transmission bandwidth has increased, provide at least one new content stream according to the bandwidth-based priority list, and, in response to determining that the available transmission bandwidth has decreased, remove at least one content stream according to the bandwidth-based priority list. The processing unit may be further operative to, in response to determining that the available transmission bandwidth has increased, provide at least one new content stream according to the bandwidth-based priority list, wherein the at least one new content stream comprises an alternate version of at least one previously provided content stream, and, in response to determining that the at least one receiver of the at least one previously provided content stream is associated with the at least one audience cohort associated with the at least one new content stream, transition the at least one receiver of the at least one previously provided content stream to the at least one new content stream. The processing unit may be further operative to, in response to determining that the available transmission bandwidth has decreased, remove the at least one content stream according to the bandwidth-based priority list, wherein the removed at least one content stream comprises an alternate version of at least one other provided content stream, and transition at least one receiver of the removed at least one content stream to the at least one other provided content stream FIG. 5 illustrates a computing device 500. Computing device 500 may include a processing unit 510 and a memory unit 520. Memory 520 may include software configured to execute application modules such as ad server 120 and/or resource manager 118. Computing device 500 may execute, for example, one or more stages included in method 300 and/or method 400 as described above with respect to FIGS. 3 and 4. Moreover, any one or more of the stages included in method 300 and/or method 400 may be performed on any element shown in FIG. 1.

Computing device 500 may be implemented using a personal computer, a network computer, a mainframe, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine.

The aforementioned systems and devices are examples and the processor may comprise other systems or devices.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing advertising driven switched digital video, the method comprising:
    forecasting a projected audience for each of a plurality of provided channels;
    creating a priority list comprising a priority associated with at least one first version and at least one second version of at least one of the plurality of provided channels;
    assigning a first plurality of advertisements to the at least one first version of the plurality of provided channels;
    assigning a second plurality of advertisements to the at least one second version of the plurality of provided channels;
    transmitting at least a first subset of the plurality of provided channels to a plurality of audience members;
    determining whether an available bandwidth for channel transmission has changed; and
    in response to determining that the available bandwidth for channel transmission has changed, transmitting at least a second subset of the plurality of provided channels to the plurality of audience members according to the priority list.

2. The method of claim 1, wherein the projected audience for each of a plurality of provided channels is divided into a plurality of audience cohorts.

3. The method of claim 2, wherein each of the plurality of audience cohorts is associated with at least one of the following: demographic characteristic, a psychographic characteristic, a customer type, and an advertiser defined characteristic.

4. The method of claim 2, wherein the at least one first version of the at least one of the plurality of provided channels is associated with a first one of the plurality of audience cohorts and the at least one second version of the at least one of the plurality of provided channels is associated with a second one of the plurality of audience cohorts.

5. The method of claim 4, wherein at least one first advertisement of the first plurality of advertisements assigned to the at least one first version of the at least one of the plurality of provided channels is targeted to the first one of the plurality of audience cohorts.

6. The method of claim 5, further comprising:
    determining whether at least one second advertisement of the first plurality of advertisements assigned to the at least one first version of the at least one of the plurality of provided channels is not targeted to the first one of the plurality of audience cohorts; and
    in response to determining that the at least one second advertisement is not targeted to the first one of the plurality of audience cohorts, replacing the at least one second advertisement with at least one third advertisement, wherein the at least one third advertisement is targeted to the first one of the plurality of audience cohorts.

7. The method of claim 6, further comprising:
    determining whether the at least one second advertisement is targeted to the second one of the plurality of audience cohorts; and
    in response to determining that the at least one second advertisement is targeted to the second one of the plurality of audience cohorts, assigning the at least one second advertisement to the second plurality of advertisements assigned to the at least one second version of the at least one of the plurality of provided channels.

8. The method of claim 6, wherein the at least one second advertisement and the at least one third advertisement comprise different ad versions each associated with an advertising campaign.

9. The method of claim 5, further comprising:
    determining whether the at least one first advertisement assigned to the at least one first version of the at least one of the plurality of provided channels and at least one second advertisement assigned to the at least one second version of the at least one of the plurality of provided channels comprise different ad versions each associated with an advertising campaign;
    in response to determining that the at least one first advertisement assigned to the at least one first version of the at least one of the plurality of provided channels and at least one second advertisement assigned to the at least one second version of the at least one of the plurality of provided channels comprise different ad versions each associated with an advertising campaign, determining whether the at least one first advertisement and the at least one second advertisement are assigned to e=be displayed at a same time; and
    in response to determining that the at least one first advertisement and the at least one second advertisement are assigned to be displayed at the same time, rescheduling the at least one second advertisement to be displayed at a different time.

10. A system for providing advertising driven switched digital video, the system comprising:
    a memory; and
    a processor coupled to the memory, wherein the processor is operative to:

create a transmission priority list comprising a plurality of content streams, wherein at least one first content stream comprises an alternate version of at least one second content stream and wherein each of the plurality of content streams is associated with at least one of a plurality of audience cohorts, assign a first plurality of advertisements to the at least one first content stream, assign a second plurality of advertisements to the at least one first content stream, receive a content stream request from at least one of a plurality of audience members, wherein each of the plurality of audience members is associated with at least one of the plurality of audience cohorts, and assign the at least one of a plurality of audience members to at least one of the plurality of content streams according to a best match between the at least one of the plurality of audience cohorts associated with the at least one of a plurality of audience members and the at least one of the plurality of audience cohorts associated with the at least one of the plurality of content streams.

11. The system of claim 10, wherein the processor is operative to:

provide a first subset of the plurality of content streams to the plurality of audience members, and provide a second subset of the plurality of content streams to the plurality of audience members according to the transmission priority list in response to detecting a change in available content stream transmission bandwidth.

12. The system of claim 11, wherein the second subset of the plurality of content streams comprises at least one new version of the assigned content stream associated with the at least one of a plurality of audience members and wherein the processor is further operative to:

determine whether the at least one of the plurality of audience cohorts associated with the at least one of a plurality of audience members comprises a better match with the at least one of the plurality of audience cohorts associated with the at least one new version of the requested content stream than with the at least one of the plurality of audience cohorts associated with the assigned content stream; and in response to determining that the at least one of the plurality of audience cohorts associated with the at least one of a plurality of audience members comprises a better match with the at least one of the plurality of audience cohorts associated with the at least one new version of the requested content stream than with the at least one of the plurality of audience cohorts associated with the assigned content stream, transition the at least one of a plurality of audience members to the at least one new version of the requested content stream.

13. The system of claim 12, wherein being operative to transition the at least one of the plurality of audience members to the at least one new version of the requested content stream comprises being operative to:

identify a plurality of black frames coinciding between the assigned content stream and the at least one new version of the requested content stream; and assign the at least one of the plurality of audience members to the at least one new version of the requested content stream during the plurality of coinciding black frames.

14. The system of claim 11, wherein being operative to assign the at least one of the plurality of audience members to the at least one of the plurality of content streams comprises being operative to:

create a plurality of MAClists each associated with at least one of the plurality of content streams;

determine which of the plurality of MAClists associated with the requested content stream comprises a unique identifier associated with the at least one of the plurality of audience members, wherein the unique identifier comprises at least one of the following: a MAC address, an IP address, and a content provider assigned identifier; and assign the at least one of the plurality of audience members to the the at least one of the plurality of content streams according to the determined MAClist.

15. The system of claim 11, wherein the processor is further operative to:

provide a new version of at least one content stream as part of the second subset of the plurality of content streams;

identify a subset of the plurality of audience members associated with the at least one content stream provided as part of the first subset of the plurality of content streams and associated with at least one audience cohort associated with the new version of at least one content stream; and assign the subset of the plurality of audience members to the new version of at least one content stream.

16. A method for providing advertising driven switched digital video, the method comprising:

providing a plurality of content streams, wherein the content streams comprise at least one first channel version stream and at least one second channel version stream, according to a bandwidth-based priority list;

assigning a first plurality of advertisements to the at least one first channel version stream;

assigning a second plurality of advertisements to the at least one second channel version stream;

determining whether an available transmission bandwidth has increased;

in response to determining that the available transmission bandwidth has increased, providing at least one new content stream according to the bandwidth-based priority list;

determining whether the available transmission bandwidth has decreased; and in response to determining that the available transmission bandwidth has decreased, removing at least one content stream according to the bandwidth-based priority list.

17. The method of claim 16, wherein the at least one first channel version stream and the at least one second channel version stream comprise each comprise at least one common content cohort and at least one differing advertisement cohort.

18. The method of claim 17, wherein the bandwidth-based priority list comprises a plurality of audience cohorts associated with each of the plurality of content streams and wherein the at least one first channel version stream and the at least one second channel version stream are each associated with at least one differing audience cohort.

19. The method of claim 18, further comprising, in response to determining that the available transmission bandwidth has increased:

providing the at least one new content stream according to the bandwidth-based priority list, wherein the at least one new content stream comprises an alternate version of at least one previously provided content stream;

determining whether at least one receiver of the at least one previously provided content stream is associated with at least one audience cohort associated with the at least one new content stream; and in response to determining that the at least one receiver of the at least one previously provided content stream is associated with the at least one audience cohort associated with the at least one new content stream, transitioning the at least one receiver of the at least one previously provided content stream to the at least one new content stream.

20. The method of claim 18, further comprising, in response to determining that the available transmission bandwidth has decreased:

removing the at least one content stream according to the bandwidth-based priority list, wherein the removed at least one content stream comprises an alternate version of at least one other provided content stream; and transitioning at least one receiver of the removed at least one content stream to the at least one other provided content stream.

* * * * *